(12) United States Patent
Takahashi

(10) Patent No.: US 9,558,369 B2
(45) Date of Patent: Jan. 31, 2017

(54) INFORMATION PROCESSING DEVICE, METHOD FOR VERIFYING ANONYMITY AND MEDIUM

(71) Applicant: NEC CORPORATION, Tokyo (JP)

(72) Inventor: Tsubasa Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/889,633

(22) PCT Filed: May 8, 2014

(86) PCT No.: PCT/JP2014/002439
§ 371 (c)(1),
(2) Date: Nov. 6, 2015

(87) PCT Pub. No.: WO2014/181541
PCT Pub. Date: Nov. 13, 2014

(65) Prior Publication Data
US 2016/0117526 A1 Apr. 28, 2016

(30) Foreign Application Priority Data

May 9, 2013 (JP) .................................. 2013-099432

(51) Int. Cl.
*G06F 21/62* (2013.01)
*H04L 29/06* (2006.01)

(52) U.S. Cl.
CPC ....... *G06F 21/6254* (2013.01); *H04L 63/0407* (2013.01)

(58) Field of Classification Search
CPC ............ G06F 21/6254; G06F 17/30598; H04L 63/0407; H04L 63/0421
See application file for complete search history.

(56) References Cited

U.S. PATENT DOCUMENTS

2002/0169793 A1* 11/2002 Sweeney ........... G06F 17/30424
2010/0077006 A1* 3/2010 El Emam .......... G06F 17/30536
707/785

(Continued)

FOREIGN PATENT DOCUMENTS

JP  2011-180839 A  9/2011
JP  2012-3440 A  1/2012

(Continued)

OTHER PUBLICATIONS

Bayardo et al, Data Privacy Through Optimal k-Anonymization, IEEE, 2005.*

(Continued)

*Primary Examiner* — Minh Dinh
(74) *Attorney, Agent, or Firm* — Sughrue Mion, PLLC

(57) ABSTRACT

The present invention provides an information processing device that enables a reduction in the processing cost of verifying anonymity during anonymization when multi-dimensional data is the subject of anonymization. The information processing device is provided with: a unit which generates information indicating the correspondence between a record contained in a data set and a class specifying a unique combination of quasi-identifier attribute values; a unit which verifies the anonymity of each record on the basis of the class thereof indicated in the information; and a unit which, on the basis of the results of verifying the anonymity, updates the information in a manner such that whether or not the record satisfies the anonymity can be identified and outputs the record-class correspondence information.

10 Claims, 17 Drawing Sheets

(56) References Cited

U.S. PATENT DOCUMENTS

2010/0332537 A1* 12/2010 El Emam ............ G06F 21/6254
707/771
2014/0189858 A1* 7/2014 Chen ................. G06F 17/30289
726/22

FOREIGN PATENT DOCUMENTS

JP   2013-80375 A    5/2013
WO   2013/031997 A1  3/2013

OTHER PUBLICATIONS

Byun et al., Efficient K-Anonymization Using Clustering Techniques, Springer-Verlag, 2007.*
LeFevre et al., Incognito: Efficient Full-Domain K-Anonymity, ACM, 2005.*
Latanya Sweeney, "k-Anonymity: A Model for Protecting Privacy", International Journal on Uncertainty, Fuzziness and Knowledge-based Systems, 2002, pp. 557-570, vol. 10, No. 5.
Kristen Lefevre, et al., "Mondrian Multidimensional k-Anonymity", Proceedings of the 22nd International Conference on Data Engineering, ICDE2006, 11 Pages.
Keiichi Hirota, et al., "Development and Evaluation of Personal Data Anonymization Platform in Information Grand Voyage Project", Technical Report of The Proceeding of The Institute of Electronics, Information and Communication Engineers, Jun. 24, 2010, 12 pages, vol. 110, No. 113.
Yu Juan, et al., "TopDown-KACA: an Efficient Local-recoding Algorithm for k-anonymity", IEEE International Conference on Granular Computing, Aug. 19, 2009, pp. 727-732.
International Search Report for PCT/JP2014/002439 dated Aug. 5, 2014 [PCT/ISA/210].
Written Opinion for PCT/JP2014/002439 dated Nov. 28, 2013 [PCT/ISA/237].

* cited by examiner

Fig.2

800 ANONYMIZATION SUBJECT DATA SET

809 ANONYMIZATION SUBJECT RECORD

| RID | GENDER | YEAR OF BIRTH | TREATMENT MONTH | TREATMENT MONTH |
|-----|--------|---------------|-----------------|-----------------|
| 1 | MALE | 1930~1939 | 4~6 | A, B, C |
| 2 | MALE | 1930~1939 | 4~6 | A, B, C |
| 3 | MALE | 1940~1949 | 4~6 | X, Y, Z |
| 4 | MALE | 1940~1949 | 4~6 | X, Y, Z |
| 5 | MALE | 1950~1959 | 4~6 | X, Y, Z |
| 6 | FEMALE | 1930~1939 | 4~6 | A, B, C |
| 7 | FEMALE | 1930~1939 | 4~6 | A, B, C |
| 8 | FEMALE | 1940~1949 | 4~6 | X, Y, Z |
| 9 | FEMALE | 1940~1949 | 4~6 | X, Y, Z |
| 10 | FEMALE | 1950~1959 | 4~6 | X, Y, Z |

810 CLASS DEFINITION TABLE

| TUPLE Q (COMBINATION OF QUASI-IDENTIFIER ATTRIBUTE VALUES) | CID |
|---|---|
| "MALE", "1930~1939", "4~6", "A, B, C" | 1 |
| "MALE", "1940~1949", "4~6", "X, Y, Z" | 2 |
| "MALE", "1950~1959", "4~6", "X, Y, Z" | 3 |
| "FEMALE", "1930~1939", "4~6", "A, B, C" | 4 |
| "FEMALE", "1940~1949", "4~6", "X, Y, Z" | 5 |
| "FEMALE", "1950~1959", "4~6", "X, Y, Z" | 6 |

820 RCM

| RID | CID |
|-----|-----|
| 1 | 1 |
| 2 | 1 |
| 3 | 2 |
| 4 | 2 |
| 5 | 3 |
| 6 | 4 |
| 7 | 4 |
| 8 | 5 |
| 9 | 5 |
| 10 | 6 |

830 ANONYMITY VERIFICATION RESULT

| CID | FREQUENCY | VERIFICATION RESULT |
|-----|-----------|---------------------|
| 1 | 2 | OK |
| 2 | 2 | OK |
| 3 | 1 | NG |
| 4 | 2 | OK |
| 5 | 2 | OK |
| 6 | 1 | NG |

821 UPDATED RCM

| RID | CID |
|-----|-----|
| 1 | 1 |
| 2 | 1 |
| 3 | 2 |
| 4 | 2 |
| 6 | 4 |
| 7 | 4 |
| 8 | 5 |
| 9 | 5 |

840 RCM

| RID | CID |
|-----|-----|
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 1 |

850 CURRENT STATE TABLE

| RID | CID | RECODED VALUE |
|---|---|---|
| 1 | 1 | ANY |
| 2 | 1 | ANY |
| 3 | 1 | ANY |
| 4 | 1 | ANY |
| 5 | 1 | ANY |
| 6 | 1 | ANY |
| 7 | 1 | ANY |
| 8 | 1 | ANY |
| 9 | 1 | ANY |
| 10 | 1 | ANY |

860 INTERIM DATA

| RID | CID | RECODED VALUE |
|---|---|---|
| 1 | 1 | 1900~1949 |
| 2 | 1 | 1900~1949 |
| 3 | 1 | 1900~1949 |
| 4 | 1 | 1900~1949 |
| 5 | 1 | 1950~1999 |
| 6 | 1 | 1900~1949 |
| 7 | 1 | 1900~1949 |
| 8 | 1 | 1900~1949 |
| 9 | 1 | 1900~1949 |
| 10 | 1 | 1950~1999 |

880 ANONYMITY VERIFICATION RESULT

| CID | RECODED VALUE | FREQUENCY |
|---|---|---|
| 1 | 1900~1949 | 8 |
| 1 | 1950~1999 | 2 |

852 UPDATED CURRENT STATE TABLE

| RID | CID | RECODED VALUE |
|---|---|---|
| 1 | 2 | 1900~1949 |
| 2 | 2 | 1900~1949 |
| 3 | 2 | 1900~1949 |
| 4 | 2 | 1900~1949 |
| 5 | 1 | 1950~1999 |
| 6 | 2 | 1900~1949 |
| 7 | 2 | 1900~1949 |
| 8 | 2 | 1900~1949 |
| 9 | 2 | 1900~1949 |
| 10 | 1 | 1950~1999 |

842 UPDATED RCM

| RID | CID |
|-----|-----|
| 1   | 2   |
| 2   | 2   |
| 3   | 2   |
| 4   | 2   |
| 6   | 2   |
| 7   | 2   |
| 8   | 2   |
| 9   | 2   |

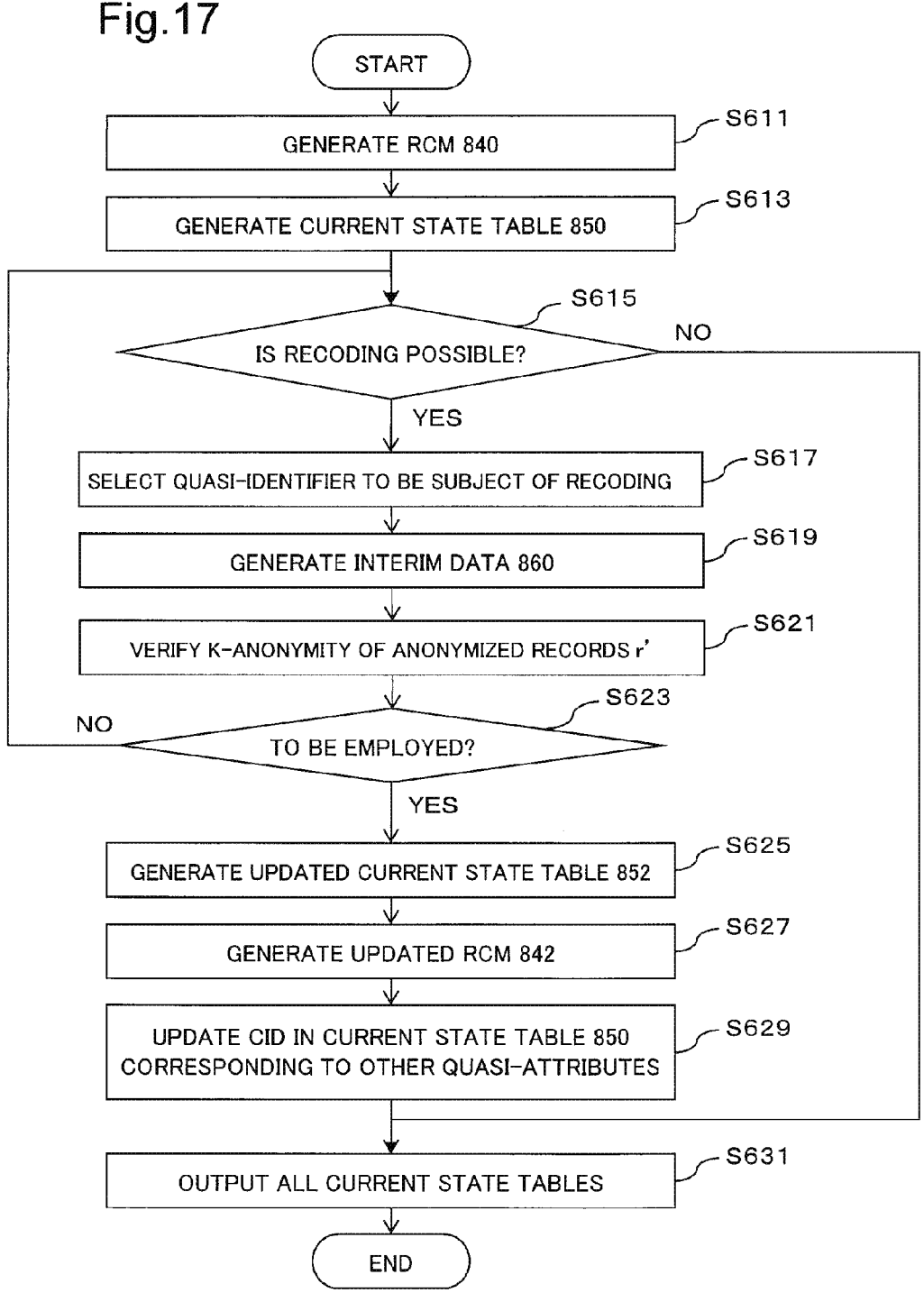

INFORMATION PROCESSING DEVICE, METHOD FOR VERIFYING ANONYMITY AND MEDIUM

CROSS REFERENCE TO RELATED APPLICATIONS

This application is a National Stage of International Application No. PCT/PCT/JP2014/002439, filed on May 8, 2014, which claims priority from Japanese Patent Application No. 2013-099432, filed on May 9, 2013, the contents of all of which are incorporated herein by reference in their entirety.

TECHNICAL FIELD

The present invention relates to an anonymization technology, and, more particularly, to a technology to verify anonymity of information, such as personal information, the disclosure and use of which without any change to the original information content are undesirable.

BACKGROUND ART

Recent years, privacy information, such as purchase records and medical healthcare records, have been accumulated by providers of sale services and medical healthcare services (service providers).

The privacy information is composed of a plurality of attributes, including attributes that are referred to as quasi-identifiers. Quasi-identifiers are attributes, such as a year of birth and a gender, that characterize individuals and the combination of which has a possibility of identifying an individual.

Such privacy information has not been subjected to an active secondary use due to concern over an invasion of privacy. The secondary use means, for example, that a service provider who has generated and accumulated privacy information provides a third party with the privacy information, and the third party uses the privacy information in order to strengthen a service the third party itself provides. The secondary use also means that a service provider who has generated and accumulated privacy information outsources analysis or the like of the privacy information to a third party, or the like.

Making secondary use of privacy information without concern over an invasion of privacy makes it possible to promote research in use of privacy information and strengthen services that use a result of analysis and research thereof. Third parties other than a service provider who owns privacy information is also able to enjoy a high benefit the privacy information has.

What is considered to be a third party includes, for example, pharmaceutical companies. For a pharmaceutical company, it is difficult to obtain medical healthcare records. Obtaining medical healthcare records enables the pharmaceutical company to have knowledge of how drugs are used. Furthermore, the pharmaceutical company is also able to analyze co-occurrence relations and correlations of the drugs from the medical healthcare records.

Each record of a data set of privacy information includes, for example, a user identifier by which a service user (individual) is uniquely identified and one or more quasi-identifiers. A service provider accumulates such a record every time a service user enjoys the service.

Providing a third party with privacy information in which user identifiers have been included without any change enables the third party to identify service users by use of the user identifiers. That may cause a problem in terms of the invasion of privacy.

There is a case in which an individual can be identified from within a data set (for example, history information) that is composed of a plurality of records, on the basis of combinations of quasi-identifiers that are included in respective records. That is, there is a case in which, even from history information from which user identifiers are removed, an individual can be identified on the basis of combinations of quasi-identifiers therein, causing an invasion of privacy.

Anonymization has been known as a method to convert a data set of privacy information that has such characteristics to a form in which privacy is protected while intrinsic usefulness is maintained.

NPL1 proposes 'k-anonymity', which is one of the most popular anonymity indicators. A method to make a data set that is a subject of anonymization satisfy such k-anonymity is referred to as 'k-anonymization'. In the k-anonymization, processing to convert quasi-identifiers is carried out in such a way that at least k or more records having the quasi-identifiers with the same values exist in the data set that is a subject of anonymization. For the conversion processing, methods, such as generalization and suppression, have been known. In the generalization, original specific information is converted to generalized information.

For example, PTL1 discloses a privacy information evaluation server. First, the privacy information evaluation server processes privacy information that is received from a user terminal. Second, the privacy information evaluation server decides whether or not the processed privacy information satisfies k-anonymity. Third, the privacy information evaluation server, on the basis of a result of the decision, outputs the processed privacy information from which identification information of users is removed.

Another related technology that uses such a k-anonymization technology is disclosed in NPL2. In NPL2, a method is proposed in which multi-dimensional data are k-anonymized by generating sets of records (hereinafter, referred to as clusters) that have similar attribute values successively and generating common attribute values in the records included in the clusters through generalization and suppression.

A k-anonymity decision unit in the privacy information evaluation server, on the basis of feedback from k-anonymity decision, generalizes the privacy information by a bottom-up process or a top-down process.

PTL2 discloses a privacy protection device for public information. First, the privacy protection device processes respective quasi-identifiers in input data to carry out generalization. Second, the privacy protection device decides whether a table that is composed of all the generalized quasi-identifiers satisfies a predetermined k-anonymity. Third, the privacy protection device, on the basis of a result of the decision, outputs an optimum data set.

CITATION LIST

Patent Literature

PTL1 Japanese Unexamined Patent Application Publication No. 2011-180839
PTL2 Japanese Unexamined Patent Application Publication No. 2012-003440

Non Patent Literature

NPL1 L. Sweeney, "k-anonymity: a model for protecting privacy", International Journal on Uncertainty, Fuzziness and Knowledge-based Systems, 10(5), pp. 555-570, 2002.

NPL2 K. LeFevre, David J. DeWitt and Raghu Ramakrishnan, "Mondrian Multidimensional k-Anonymity", ICDE2006. Proceedings of the 22nd International Conference on Data Engineering Page 25, 2006.

SUMMARY OF INVENTION

Technical Problem

However, in the technologies disclosed in the above-described patent literatures and non-patent literatures, when multi-dimensional data are a subject of anonymization, there is a problem in that a calculation cost in anonymity verification increases in proportion to the number of dimensions.

That is because, in any of the technologies disclosed in the above-described patent literatures and non-patent literatures, processing characteristics of anonymity verification are not taken into consideration in the anonymization for multi-dimensional data. Hereinafter, the reason for the above problem will be described in detail.

When k-anonymization is applied, anonymity verification to decide whether or not a data set satisfies k-anonymity is carried out many times. In particular, to generate k-anonymized data with a high utility, it is required to process (recode) respective attributes (quasi-identifiers) in a step-by-step manner in such a way that the utility thereof heightens. The anonymity verification is required to be carried out every time each attribute is processed.

A plurality of attributes being processed means that multi-dimensional data are a subject of anonymization.

In the anonymity verification, the number of records that include the same tuple of values for all quasi-identifiers or the number of varieties of unique user identifier in such records are first counted for a data set that is a subject of verification. The data set includes the records that include the user identifiers.

A set of records that include the same tuple of values for all quasi-identifiers is referred to as an equivalent class or a class.

When the number of records (or the number of varieties of unique user identifier) in a class is greater than or equal to k, it is decided that a set of records included in the class satisfy k-anonymity. When the number of records in a class is less than k, it is decided that a set of records included in the class do not satisfy k-anonymity. When the anonymity verification is carried out for all records included in a data set and all the records satisfy k-anonymity, it is decided the data set satisfies k-anonymity.

In the anonymity verification, it is required to count, with respect to tuples Q appearing in the subject data set, the number of records or the number of varieties of unique user identifier included therein. The above-described tuples Q are combinations across all attribute values of all quasi-identifiers. As the number of quasi-identifiers increases, the number of combinations the tuples Q may take increases.

It is, for example, assumed that d (d≥1) quasi-identifiers $q_i$ (i=1, ..., d) exist, and the number of unique attribute values of each quasi-identifier $q_i$ is denoted by $|q_i|$. In this case, the maximum number of combinations, which is required to be taken into consideration in the anonymity verification, is $|q_1| \times |q_2| \times \ldots \times |q_d|$. Although recoding the respective quasi-identifiers makes the number of combinations increase or decrease, the number of combinations basically increases in proportion to the number of quasi-identifiers.

In the anonymity verification, it becomes required to carry out data references d times, which is the number of quasi-identifiers, in the processing to extract the tuples Q. When it is assumed that the number of records is denoted by N (N≥1), it becomes required to carry out references as many as dN times. Further, when the respective quasi-identifiers are arranged in a distributed manner, a high cost per reference is required, causing the total reference cost to further increase.

An object of the present invention is to provide an information processing device, an anonymity verification method, and a program therefor or a computer-readable non-transitory recording medium recording the program that are capable of solving the above-described problem.

Solution to Problem

An information processing device according to one aspect of the present invention includes:

a correspondence information generation unit which generates record-class correspondence information that indicates correspondences between a record included in a data set and a class that specifies unique combinations of quasi-identifier attribute values, which are values of quasi-identifiers included in the record;

an anonymity verification unit which verifies anonymity for each the record on the basis of the classes that are indicated in the record-class correspondence information; and a correspondence information update unit which, on the basis of a result of verifying the anonymity, updates said record-class correspondence information in such a way that whether or not the record satisfies the anonymity is distinguishable and outputs the record-crass correspondence information.

An anonymity verification method according to one aspect of the present invention which an information processing device:

generates record-class correspondence information that indicates correspondences between a record included in a data set and a class that specifies unique combinations of quasi-identifier attribute values, which are values of quasi-identifiers included in the record;

verifies anonymity for each the record on the basis of the classes indicated in the record-class correspondence information; and updates the record-class correspondence information on the basis of a result of verifying the anonymity in such a way that whether or not the record satisfies the anonymity is distinguishable and outputs the record-class correspondence information.

A computer-readable non-transitory recording medium recording a program, the program making a computer execute the steps of:

generating record-class correspondence information that indicates correspondences between a record included in a data set and a class that specifies unique combinations of quasi-identifier attribute values, which are values of quasi-identifiers included in the record;

verifying anonymity for each the record on the basis of the classes indicated in the record-class correspondence information; and updating the record-class correspondence information on the basis of a result of verifying the anonymity in such a way that whether or not the record satisfies the anonymity is distinguishable and outputting the record-class correspondence information.

Advantageous Effects of Invention

The present invention includes an advantageous effect that, when multi-dimensional data are a subject of anonymization, it is made possible to reduce a calculation cost of anonymity verification in the anonymization.

BRIEF DESCRIPTION OF DRAWINGS

FIG. 2 is a diagram illustrating an example of an anonymization subject data set in the first exemplary embodiment;

FIG. 17 is a flowchart illustrating an operation of the anonymity verification device in the second exemplary embodiment.

DESCRIPTION OF EMBODIMENTS

Figure 1:
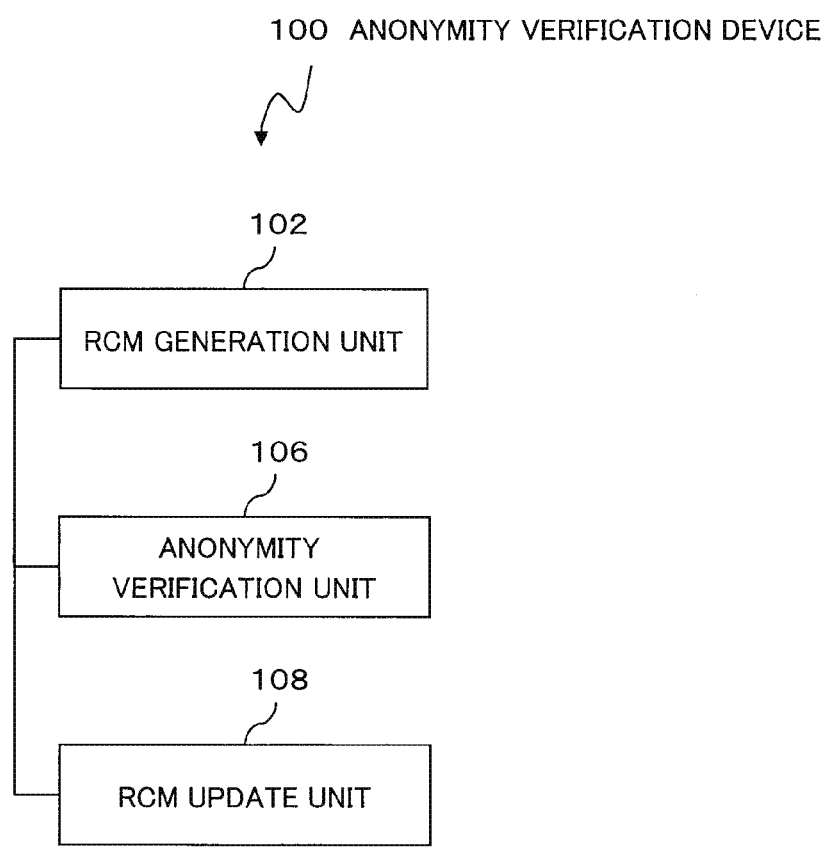
FIG. 1 is a block diagram illustrating a configuration of an anonymity verification device according to a first exemplary embodiment of the present invention.

Hereinafter, exemplary embodiments of the present invention will be described in detail with reference to the accompanying drawings. In respective drawings and respective exemplary embodiments disclosed in the description, the same components will be denoted by the same reference numerals and description thereof will be omitted appropriately. In the following exemplary embodiments and respective drawings, commonly used technologies will be employed for configurations that are not essential to the present invention, and detailed description thereof in the exemplary embodiments and illustration thereof will be omitted.

<<<First Exemplary Embodiment>>>

FIG. 1 is a block diagram illustrating a configuration of an anonymity verification device (also referred to as an information processing device) 100 according to a first exemplary embodiment. As illustrated in FIG. 1, the anonymity verification device 100 includes an RCM generation unit (also referred to as a correspondence information generation means) 102, an anonymity verification unit 106, and an RCM update unit (also referred to as a correspondence information update means) 108. The components illustrated in FIG. 1 may be either components corresponding to hardware units or components defined in accordance with division into functional units of a computer device. The following description will be made under the assumption that the components illustrated in FIG. 1 are components defined in accordance with division into functional units of a computer device.

First, a summary of operations of the anonymity verification device 100 according to the exemplary embodiment will be described.

The anonymity verification device 100 extracts tuples Q from respective ones of all anonymization subject records (simply, also referred to as records) 809 that are included in an anonymization subject data set (simply, also referred to as a data set). The above-described tuple Q indicates 'a unique combination of values of quasi-identifiers (also referred to as quasi-identifier attribute values) for all varieties of quasi-identifier'. A value of a quasi-identifier is a piece of data that indicates a specific content of the quasi-identifier and a piece of information that is not limited to a numerical value (for example, characters or the like).

Next, the anonymity verification device 100 defines classes each of which uniquely specifies each of the extracted tuples Q, and generates a record-class map (RCM, also referred to as record-class correspondence information) that maps each of the anonymization subject records 809 to one of the classes.

The anonymity verification device 100, on the basis of the record-class map, verifies k-anonymity of respective anonymized records r'. The above-described anonymized record r' is a record that corresponds to an anonymization subject record 809 and into which the anonymization subject record 809 is anonymized or to be anonymized.

The anonymity verification device 100, on the basis of a result of verifying k-anonymity of every anonymized record r', updates the record-class map in such a way that an anonymized record r' that does not satisfy the k-anonymity is distinguishable.

Next, respective components included in the anonymity verification device 100 of the exemplary embodiment will be described.

—RCM Generation Unit 102—

The RCM generation unit 102 extracts tuples Q from all anonymization subject records 809 included in an anonymization subject data set 800.

FIG. 2 is a diagram illustrating an example of the anonymization subject data set 800 in the exemplary embodiment.

As illustrated in FIG. 2, the anonymization subject data set 800 includes a plurality of anonymization subject records 809. Each of the anonymization subject records 809 includes an RID (record identifier or record ID) that identifies the anonymization subject record 809 itself and one or more quasi-identifier. The quasi-identifiers are, for example, 'gender', 'year of birth', 'treatment month', and 'disease name'. The anonymization subject data set 800 may, regardless of the example illustrated in FIG. 2, include arbitrary attributes. The quasi-identifiers may also be arbitrary ones among the attributes included in the anonymization subject data set 800.

The anonymization subject data set 800 is information, such as personal information, the disclosure and use of which without any change to the original information content are undesirable.

The RCM generation unit 102, for example, extracts the following six varieties of tuple Q from the anonymization subject data set 800 illustrated in FIG. 2.

{"male", "1930-1939", "4-6", "A, B, C"}, {"male", "1940-1949", "4-6", "X, Y, Z"}, {"male", "1950-1959", "4-6", "X, Y, Z"}, {"female", "1930-1939", "4-6", "A, B, C"}, {"female", "1940-1949", "4-6", "X, Y, Z"}, and {"female", "1950-1959", "4-6", "X, Y, Z"}.

As described earlier, the tuples Q are unique combinations of values of the quasi-identifiers for all varieties of quasi-identifier. The tuples Q may also be unique combinations of values of arbitrary varieties of quasi-identifier that the anonymity verification unit 106 uses for k-anonymity verification.

Next, the RCM generation unit 102 defines a class for each of the extracted tuples Q.

Figure 3:
FIG. 3 is a diagram illustrating an example of class definitions in the first exemplary embodiment.

FIG. 3 is a diagram illustrating an example of a class definition table 810 in the exemplary embodiment. As illustrated in FIG. 3, the class definition table 810 indicates correspondences between one of the extracted tuples Q and a CID (Class Identifier or class ID). The class IDs are pieces of ID information that are defined for the respective tuples Q and uniquely identify the classes.

The RCM generation unit 102 assigns, to the CIDs of the respective classes, arbitrary values that do not overlap with one another and are uniquely distinguishable. For example, the RCM generation unit 102 assigns sequential numbers starting from 1 to the order of extraction of the tuples Q.

Next, the RCM generation unit 102, on the basis of the tuples Q corresponding to the respective anonymization subject records 809, generates a record-class map. The record-class map maps the anonymization subject records 809 to the defined classes. A set of anonymization subject records 809 that belong to the same class is a set of anonymization subject records 809 that correspond to the same tuple Q (that is, the same unique combination of values of the quasi-identifiers).

For example, a set of anonymization subject records 809 that include a tuple Q of '{"male", "1930-1939", "4-6", "A, B, C"}', the CID of which is '1', is composed of anonymization subject records 809 having RIDs of '1' and '2'. Thus, the anonymization subject records 809 having RIDs of '1' and '2' belong to a class the CID of which is '1'. The RCM generation unit 102 also maps anonymization subject records 809 having RIDs of '3' to '10' to any one of the respective classes on the basis of the tuples Q in a similar manner.

Figure 4:
FIG. 4 is a diagram illustrating an example of a record-class map in the first exemplary embodiment.

FIG. 4 is a diagram illustrating an example of an RCM 820 in the exemplary embodiment. As illustrated in FIG. 4, the RCM 820 indicates correspondences between the RIDs and the CIDs, that is, correspondences between the anonymization subject records 809 and the classes.

—Anonymity Verification Unit 106—

The anonymity verification unit 106, on the basis of the RCM 820, evaluates k-anonymity of the anonymized record r'.

Specifically, the anonymity verification unit 106 counts frequency (the number of RIDs) of each CID in the RCM 820, and, on the basis of the frequency, evaluates k-anonymity of the anonymized record r'. That is, a class the frequency of which is greater than or equal to k satisfies the k-anonymity. Thus, anonymized record r' that belongs to the class that satisfies the k-anonymity also satisfies the k-anonymity.

Figure 5:
FIG. 5 is a diagram illustrating an example of an anonymity verification result in the first exemplary embodiment.

FIG. 5 is a diagram illustrating an example of an anonymity verification result 830, which indicates a result of the k-anonymity evaluation by the anonymity verification unit 106.

The anonymity verification result 830 illustrated in FIG. 5 indicates a result of verifying k-anonymity with k=2 for the RCM 820 in FIG. 4. Each row includes a CID, a frequency of RIDs corresponding to the CID (the number of RIDs, that is, the number of anonymization subject records 809, in each class), and a verification result from an evaluation of whether or not the k-anonymity is satisfied on the basis of the frequency. A verification result of 'OK' indicates that the k-anonymity is satisfied and a verification result of 'NG' indicates that the k-anonymity is not satisfied.

FIG. 5 illustrates that classes corresponding to CIDs of '3' and '6' do not satisfy the k-anonymity. Thus, it is illustrated that anonymized record r' that belongs to the classes and correspond to RIDs of '5' and '10' does not satisfy the k-anonymity.

In the above verification, the anonymity verification unit 106 is capable of verifying k-anonymity by referring to only the CIDs, which makes it possible to achieve anonymity verification by N (the number of records) references to the attribute values.

That is, when it is assumed that the number of records and the number of quasi-identifiers are denoted by N (N≥1) and d (d≥1), respectively, generation of the RCM 820 requires dN references to the anonymization subject data set 800. However, when anonymity verification is carried out in the processing thereafter, the anonymity verification unit 106 is capable of verifying k-anonymity by N references or a number of references equivalent to only the number of records in the class to which an anonymized record r', which is to be verified, belongs.

—RCM Update Unit 108—

The RCM update unit 108, on the basis of the anonymity verification result 830, generates and outputs an updated RCM. The RCM update unit 108 updates the RCM 820 to generate an updated RCM so that an anonymized record r' that does not satisfy k-anonymity is distinguished.

Specifically, the RCM update unit 108 removes, from the RCM 820, a row that corresponds to an anonymized record r' not satisfying k-anonymity. The RCM update unit 108 may manage a class ID that corresponds to an anonymized record r' not satisfying k-anonymity in a distinguishable manner from a class IDs that corresponds to anonymized record r' satisfying k-anonymity. For example, the RCM update unit 108 may append, to a class ID, information (for example, a predetermined value) indicating that k-anonymity is not satisfied.

Figure 6:
FIG. 6 is a diagram illustrating an example of an updated record-class map in the first exemplary embodiment.

FIG. 6 is a diagram illustrating an example of an updated RCM 821. As illustrated in FIG. 6, the updated RCM 821 is generated by removing rows having RIDs of '5' and '6' from the RCM 820 illustrated in FIG. 4. That is, the updated RCM 821 is generated by removing, from the RCM 820, a row (in general, also referred to as information) that corresponds to an anonymized record r' not satisfying k-anonymity.

The above is the description of the respective components corresponding to the functional units of the anonymity verification device 100.

Next, the components corresponding to hardware units of the anonymity verification device 100 will be described.

In the exemplary embodiment, the anonymity verification device 100 can be achieved by an information processing device, such as a computer. Respective components (functional blocks) of the anonymity verification device 100 and an anonymization device 200 in a second exemplary embodiment, which will be described later, are achieved by a program being executed on hardware resources with which the information processing device is equipped. The program is also referred to as a computer program or a software program.

For example, the anonymity verification device 100 is achieved through collaboration between hardware, such as a CPU (Central Processing Unit), a main storage device, and an auxiliary storage device of a computer, and a program that is loaded from a storage device or the like to the main storage device.

However, an implementation form of the program is not limited to the block configuration illustrated in FIG. 1 (the RCM generation unit 102, the anonymity verification unit 106, and the RCM update unit 108), and various implementation forms that those skilled in the art are able to employ are applicable (the same applies to the respective exemplary embodiments below). The anonymity verification device 100 and anonymization devices according to the respective exemplary embodiments, which will be described later, may be achieved by a dedicated device.

Figure 7:
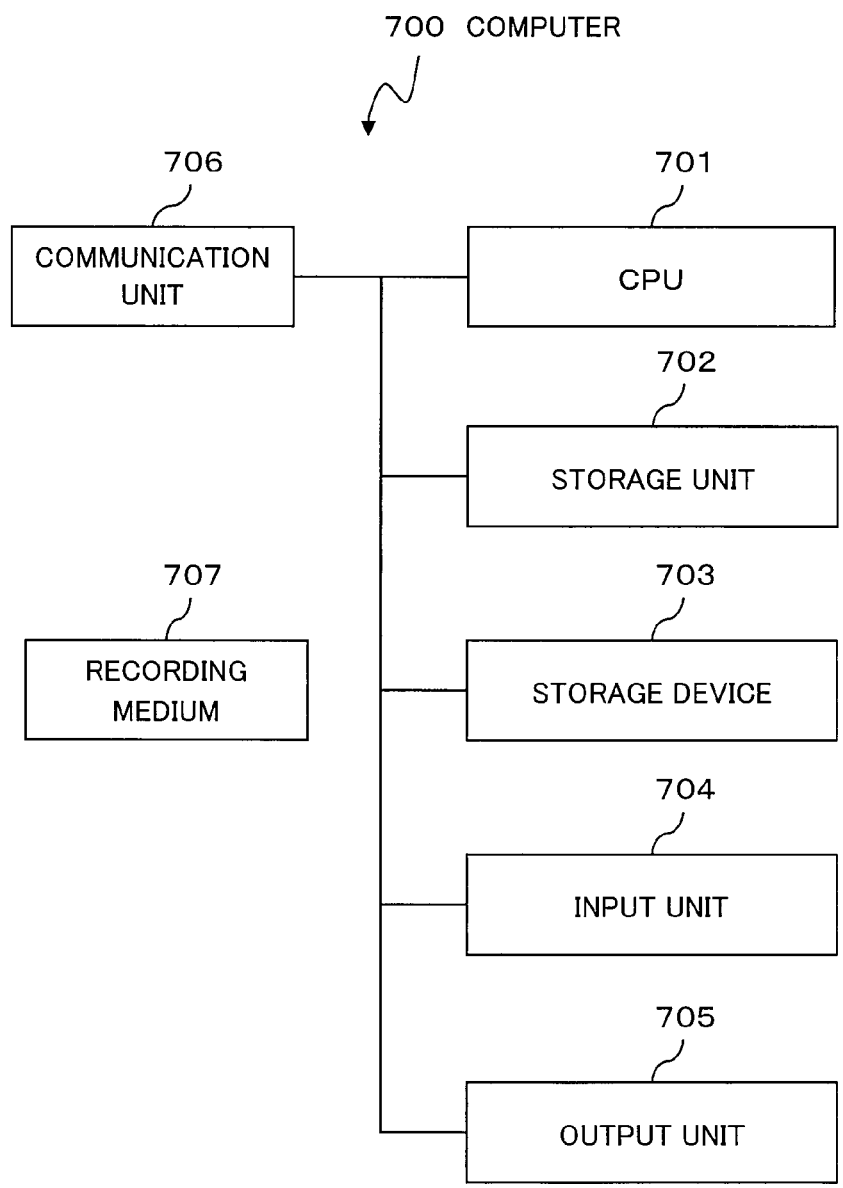
FIG. 7 is a block diagram illustrating a hardware configuration of a computer for achieving the anonymity verification device according to the first exemplary embodiment.

FIG. 7 is a diagram illustrating a hardware configuration of a computer 700 for implementing the anonymity verification device 100 according to this exemplary embodiment.

As illustrated in FIG. 7, the computer 700 includes a CPU (Central Processing Unit) 701, a storage unit 702, a storage device 703, an input unit 704, an output unit 705, and a communication unit 706. In addition, the computer 700 includes a recording medium (or a storage medium) 707 provided externally. The recording medium 707 may be a nonvolatile recording medium storing information non-temporarily.

The CPU 701 controls the entire operation of the computer 700 by causing the operating system (not illustrated) to operate. In addition, the CPU 701 loads a program or data from the recording medium 707 supplied to the storage device 703, for example, and writes the loaded program or data in the storage unit 702. Here, the program is, for example, a program for causing the computer 700 to perform the operations in the flowcharts presented in FIG. 8 to be described later.

Then, the CPU 701 carries out various processes as the RCM generation unit 102, the anonymity verification unit 106, and the RCM update unit 108 presented in FIG. 1, according to the loaded program or on the basis of the loaded data.

Alternatively, the CPU 701 may be configured to download a program or data from an external computer (not illustrated) connected to a communication network (not illustrated), to the storage unit 702.

The storage unit 702 stores programs and data. The storage unit 702 may store the anonymization subject data set 800, the class definition table 810, the RCM 820, the anonymity verification result 830, and the updated RCM 821.

For example, the storage device 703 is an optical disc, a flexible disc, a magnetic optical disc, an external hard disk, or a semiconductor memory, and includes a non-volatile storage medium 707. The storage device 703 records a program so that it is computer-readable. The storage device 703 may record data. The storage device 703 may store the anonymization subject data set 800, the class definition table 810, the RCM 820, the anonymity verification result 830, and the updated RCM 821.

The input unit 704 is realized by a mouse, a keyboard, or a built-in key button, for example, and used for an input operation. The input unit 704 is not limited to a mouse, a keyboard, or a built-in key button, it may be a touch panel, for example. The output unit 705 may be included in the RCM generation unit 102 as a part of it. In this case, the RCM generation unit 102 may receive an instruction to start processing and a specification of the anonymization subject data set 800 via an input unit 704.

The output unit 705 is realized by a display, for example, and is used in order to check the disclosure response 650, for example. The output unit 705 may be included in the RCM generation unit 102, the anonymity verification unit 106, and the RCM update unit 108 as a part of each of them. In this case, the respective components may output a result of processing, an occurrence of abnormality, and the like via an output unit 705.

The communication unit 706 realizes communication with an external device. The communication unit 706 may be included in the RCM generation unit 102 as a part of it. In this case, the RCM generation unit 102 may acquire the anonymization subject data set 800 from an external device via an communication unit 706.

As described above, the blocks serving as functional units of the anonymity verification device 100 illustrated in FIG. 1 may be implemented by the computer 700 having the hardware configuration illustrated in FIG. 7. However, means for implementing the units included in the computer 700 are not limited to those described above. In other words, the computer 700 may be implemented by a single physically-integrated device, or may be implemented by two or more physically-separated devices that are connected to each other with wire or by wireless.

Instead, the recording medium 707 with the codes of the above-described programs recorded therein may be provided to the computer 700, and the CPU 701 may be configured to load and then execute the codes of the programs stored in the recording medium 707. Alternatively, the CPU 701 may be configured to store the codes of each program stored in the recording medium 707, in the storage unit 702, the storage device 703, or both. In other words, this exemplary embodiment includes an exemplary embodiment of the recording medium 707 for storing programs (software) to be executed by the computer 700 (CPU 701) in a transitory or non-transitory manner.

The above is the description of hardware about each component of the computer 700 which realizes the anonymity verification device 100.

Next, an operation of the exemplary embodiment will be described in detail with reference to FIGS. 1 to 8.

Figure 8:
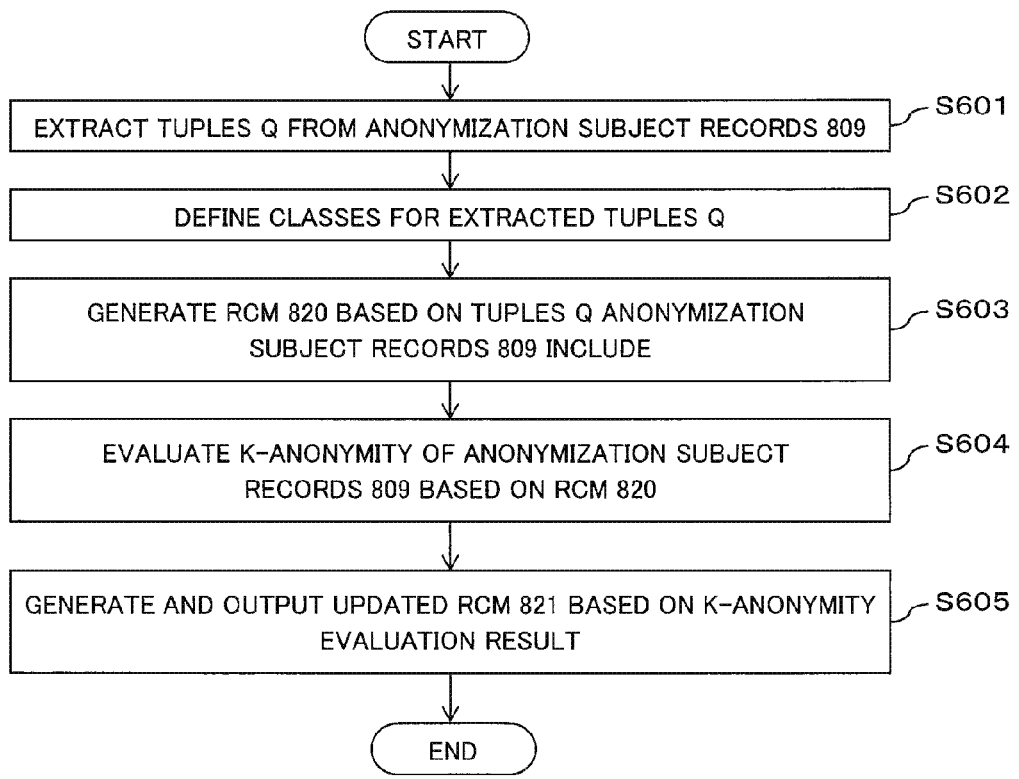
FIG. 8 is a flowchart illustrating an operation of the anonymity verification device in the first exemplary embodiment.

FIG. 8 is a flowchart illustrating an operation of the exemplary embodiment. Processing in accordance with the flowchart may be carried out on the basis of program control by the afore-described CPU 701. Step names of the processing are denoted by signs, such as S601.

The RCM generation unit 102 extracts tuples Q from all the anonymization subject records 809 included in the anonymization subject data set 800 (step S601).

For example, the anonymization subject data set 800 may be stored in the storage unit 702 or the storage device 703, illustrated in FIG. 7, in advance. The RCM generation unit 102 may acquire the anonymization subject data set 800 that an operator has input via the input unit 704 illustrated in FIG. 7. The RCM generation unit 102 may receive the anonymization subject data set 800 from a not-illustrated device via the communication unit 706 illustrated in FIG. 7. The RCM generation unit 102 may acquire the anonymization subject data set 800 recorded in a recording medium 707 via the storage device 703 illustrated in FIG. 7.

Next, the RCM generation unit 102 defines a class for each of the extracted tuples Q (step S602).

Next, the RCM generation unit 102, on the basis of the tuples Q that the respective anonymization subject records 809 include, generates the RCM 820 that maps the anonymization subject records 809 to the defined classes (step S603).

Next, the anonymity verification unit 106, on the basis of the RCM 820, evaluates k-anonymity of respective anonymized records r' (step S604).

Next, the RCM update unit 108, on the basis of a result of the evaluation of k-anonymity, updates the RCM 820 to generate and output the updated RCM 821 (step S605).

For example, the RCM update unit 108 outputs the updated RCM 821 via the output unit 705 illustrated in FIG. 7. The RCM update unit 108 may transmit the updated RCM 821 to a not-illustrated device via the communication unit 706 illustrated in FIG. 7. The RCM update unit 108 may record the updated RCM 821 in the recording medium 707 via the storage device 703 illustrated in FIG. 7.

As described above, when anonymity verification is carried out in the anonymization of multi-dimensional data like the anonymization subject data set 800, the anonymity verification device 100 of the exemplary embodiment repeats reference to the RCM 820 as many times as the number of anonymized records r' (for example, N (N≥1)). The number of references to the RCM 820 by the anonymity verification device 100 is independent of the number of quasi-identifiers (for example, d (d≥1)). That is, the anonymity verification device 100 is capable of controlling the number of data references in the anonymity verification process to N. On the other hand, in related technologies, the data reference is carried out as many as dN times.

An advantageous effect in the above-described exemplary embodiment is that, when multi-dimensional data is a subject of anonymization, it is made possible to reduce a calculation cost for anonymity verification in the anonymization.

That is because the RCM generation unit 102 generates the RCM 820, the anonymity verification unit 106 verifies k-anonymity on the basis of the RCM 820, and the RCM update unit 108, on the basis of a verification result, updates the RCM 820 to generate and output the updated RCM 821.

<<<Second Exemplary Embodiment>>>

Next, a second exemplary embodiment of the present invention will be described in detail with reference to the accompanying drawings. Hereinafter, within a scope that does not obscure the description of the exemplary embodiment, description of portions overlapping the earlier description will be omitted.

The exemplary embodiment discloses a method to achieve anonymity verification that is carried out during anonymization processing while reducing a data reference cost by using a record-class map.

The exemplary embodiment discloses a case in which a state causing a low information loss while satisfying k-anonymity is searched in a step-by-step manner. Specifically, the exemplary embodiment discloses a case in which recoding is carried out by repeating refining (specializing) quasi-identifiers step by step starting from the quasi-identifiers in the most generalized state and verifying anonymity when the refinement is carried out.

Figure 9:
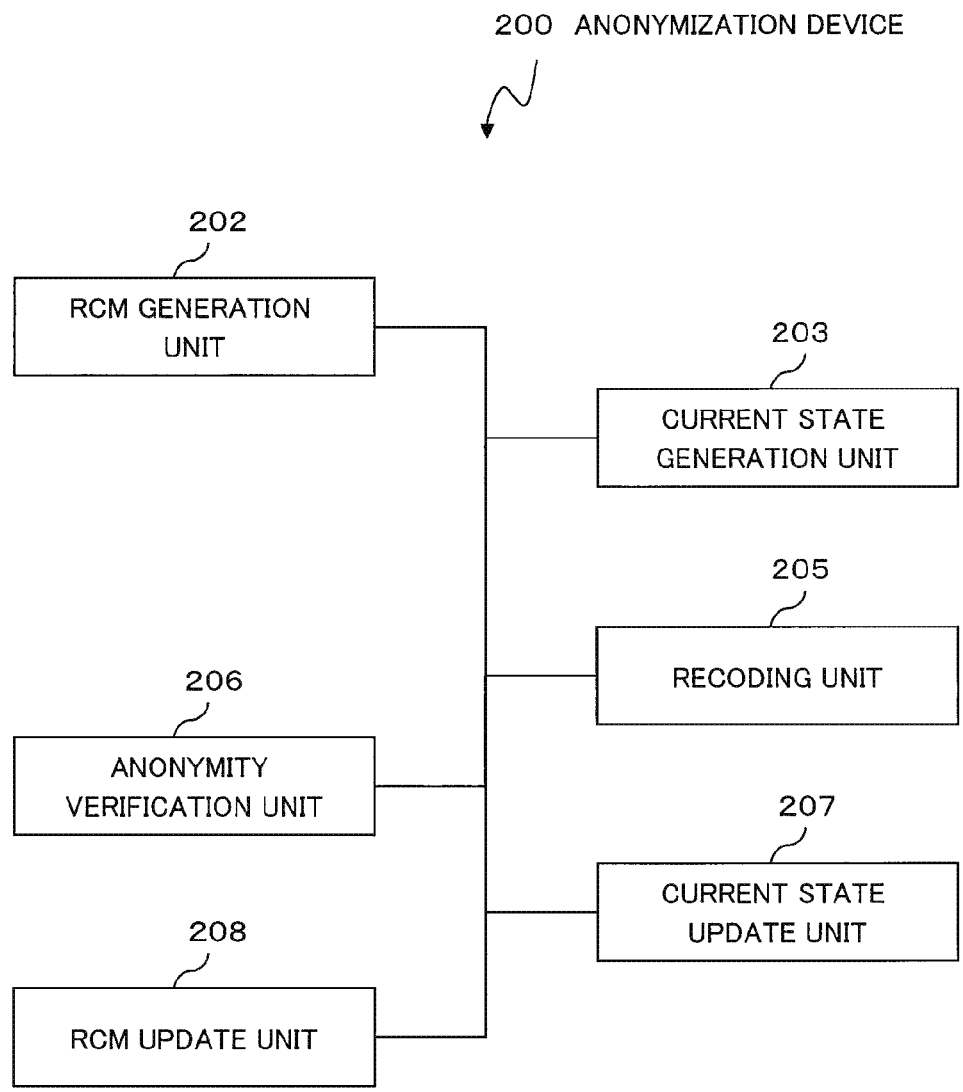
FIG. 9 is a block diagram illustrating a configuration of an anonymity verification device according to a second exemplary embodiment of the present invention.

FIG. 9 is a functional block diagram illustrating a configuration of an anonymization device (also referred to as an information processing device) 200 according to the second exemplary embodiment of the present invention.

As illustrated in FIG. 9, the anonymization device 200 includes an RCM generation unit 202, a current state generation unit 203, a recoding unit 205, an anonymity verification unit 206, a current state update unit 207, and an RCM update unit 208.

—RCM Generation Unit 202—

The RCM generation unit 202, on the basis of an anonymization subject data set 800, generates a record-class map (RCM).

Figure 10:
FIG. 10 is a diagram illustrating an example of a record-class map in the second exemplary embodiment.

FIG. 10 is a diagram illustrating an example of an RCM 840 that the RCM generation unit 202 generates. The RCM 840 includes one variety of CID. That is, the RCM 840 illustrated in FIG. 10 indicates that all anonymized records r' belong to the same class.

—Current State Generation Unit 203—

The current state generation unit 203, on the basis of the RCM 840, generates a current state table with respect to each quasi-identifier.

Figure 11:
FIG. 11 is a diagram illustrating an example of a current state table in the second exemplary embodiment.

FIG. 11 is a diagram illustrating an example of a current state table 850. As illustrated in FIG. 11, the current state table 850 includes tuples of an RID (record identifier), a CID (class identifier), and a recoded value.

The current state table 850 illustrated in FIG. 11 is generated on the basis of the anonymization subject data set 800 illustrated in FIG. 2 and the RCM 840 illustrated in FIG. 10. The current state table 850 is an example of current state records that correspond to a case of using a top-down recoding. The top-down recoding is a recoding to process (specialize) values of a quasi-identifier in such a way that, while satisfying a predetermined k-anonymity, the range and characteristics of attribute values of the quasi-identifier approach those of the original attribute values.

The recoded values are generated by processing attribute values of the quasi-identifier. All recoded values included in a current state table 850 are the same (for example, 'ANY') for every current state table 850 corresponding to any quasi-identifier. 'ANY' covers all values that a quasi-identifier may take. That is, a current state table 850 includes the most generalized value of a quasi-identifier as recoded values.

The current state records may be current state records that correspond to a case of using a bottom-up recoding, which will be described below. The bottom-up recoding is a recoding in which original attribute values of the quasi-identifier are processed (generalized) in such a way that a predetermined k-anonymity is satisfied.

In this case, recoded values included in the current state records are original attribute values that are included in anonymization subject records 809 corresponding to the current state records.

—Recoding Unit 205—

The recoding unit 205 processes recoded values in the current state table 850 to generate interim data.

Figure 12:
FIG. 12 is a diagram illustrating an example of interim data in the second exemplary embodiment.

FIG. 12 is a diagram illustrating an example of interim data 860. As illustrated in FIG. 12, the interim data 860, as with the current state table 850 illustrated in FIG. 11, include tuples of an RID, a CID, and a recoded value. The recoded values included in the interim data 860 are generated by processing the recoded values in the current state table 850.

Figure 13:
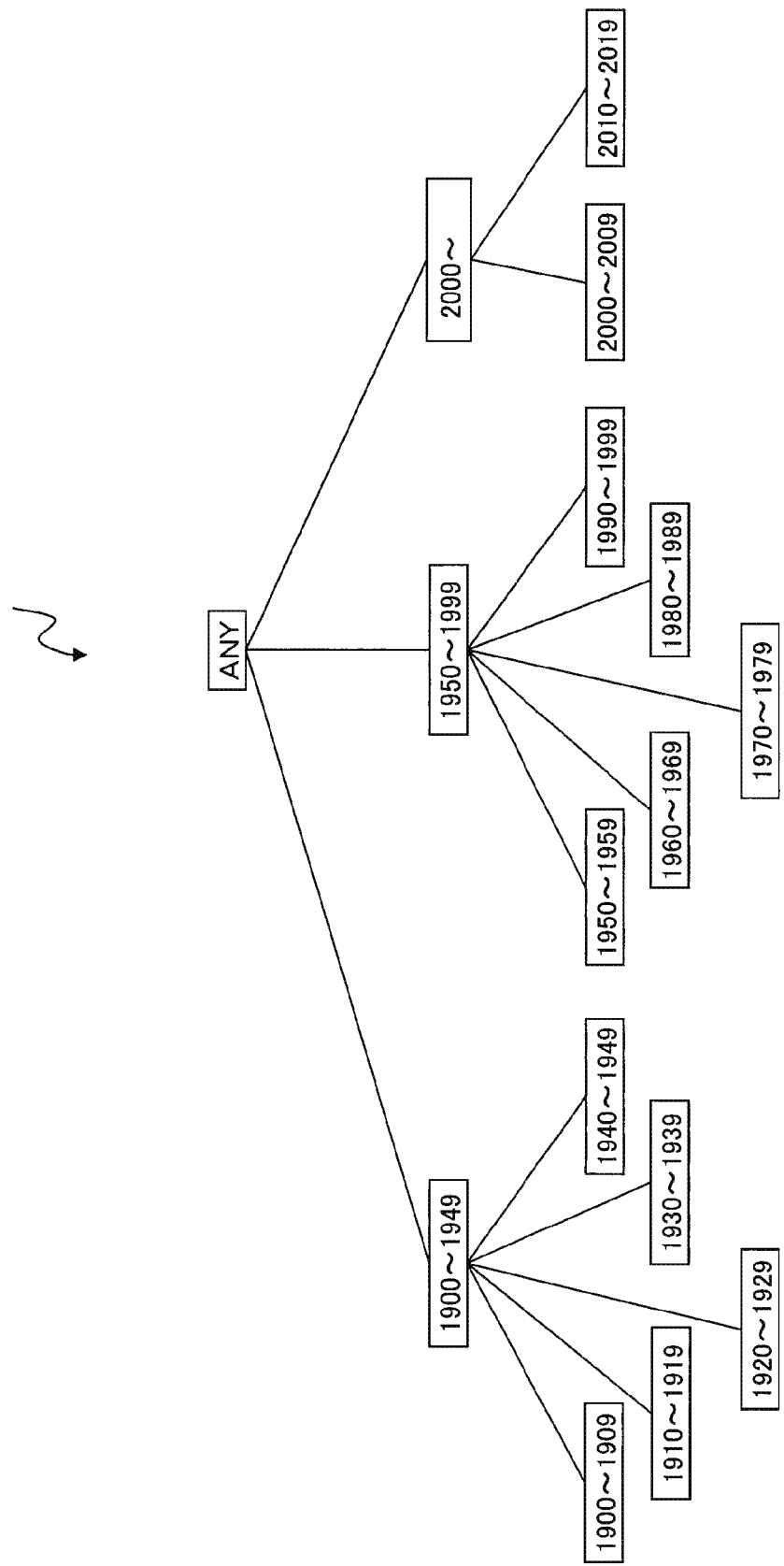
FIG. 13 is a diagram illustrating an example of a generalization hierarchy of an attribute in the second exemplary embodiment.

FIG. 13 is a diagram illustrating an example of a generalization hierarchy 870. As illustrated in FIG. 13, the generalization hierarchy 870 is a generalization hierarchy of a year of birth attribute, which includes, at the highest level, the root with a value covering all values that the year of birth attribute may take, and, towards lower levels, nodes with values that are specialized step-by-step.

For example, the recoding unit 205, on the basis of the generalization hierarchy 870 illustrated in FIG. 13, recodes the attribute (quasi-identifier) 'year of birth', which is included in the current state table 850 illustrated in FIG. 11, to generate the interim data 860 illustrated in FIG. 12.

Specifically, the recoding unit 205 recodes the quasi-identifier 'year of birth' included in the current state table 850 on the basis of values of the quasi-identifier 'year of birth' included in the anonymization subject data set 800 and the generalization hierarchy 870. Specifically, the recoding unit 205 recodes the quasi-identifier 'year of birth' from 'ANY', which is in the most generalized state, to '1900-1949', '1950-1999', and '2000-', which are obtained by carrying out refinement by one level.

The interim data 860 is an example of the interim data that correspond to the case of using the top-down recoding. In the case of using the bottom-up recoding, the recoding unit 205 recodes the quasi-identifier 'year of birth' from the original attribute values to values that are obtained by carrying out generalization by one level.

—Anonymity Verification Unit 206—

The anonymity verification unit 206, on the basis of the interim data 860, verifies k-anonymity of respective anonymized records r'.

For example, the anonymity verification unit 206 counts the number of anonymized records r' that include the same tuple (CID, recoded value) in the interim data 860. Alternatively, the verification of k-anonymity may be achieved by counting the number of varieties of attribute, such as a personal identifier, that correspond to the anonymized records r' having the same tuple (CID, recoded value).

Anonymized records r' that correspond to the same tuple (CID, recoded value) and the counted number of which is greater than or equal to k satisfy k-anonymity. Anonymized records r' that correspond to the same tuple (CID, recoded value) and the counted number of which is less than k do not satisfy k-anonymity. It is possible to assume that a group of the anonymized records r' that include the same tuple (CID, recoded value) belong to the same class.

Figure 14:
FIG. 14 is a diagram illustrating an example of an anonymity verification result in the second exemplary embodiment.

FIG. 14 is a diagram illustrating a result of evaluating k-anonymity (k=2) for the interim data 860 in FIG. 12. The anonymity verification result 880 illustrated in FIG. 14 includes tuples (CID, recoded value) and frequency values. Each frequency value is the number of anonymized records r' that include the corresponding tuple (CID, recoded value). It is illustrated that the class corresponding to the tuple the CID and the recoded value of which are '1' and '1900-1949', respectively, includes a frequency value of '8' and thus satisfies the k-anonymity. FIG. 14 also illustrates that the class corresponding to the tuple (CID, recoded value) the CID and the recoded value of which are '1' and '1950-1999', respectively, includes a frequency value of '2' and satisfies the k-anonymity.

—Current State Update Unit 207—

When the RCM update unit 208, which will be described later, decides to employ the interim data 860, the current state update unit 207 reflects the recoded values included in the interim data 860 on the current state table 850. Further, the current state update unit 207 updates CIDs in the current state table 850 to generate an updated current state table 852. The current state update unit 207 assigns, as new updated CIDs, values each of which is unique with respect to a combination of a CID and a recoded value, which are included in the anonymity verification result 880 illustrated in FIG. 14.

The current state update unit 207, on the basis of an updated RCM 842, which will be described later, updates CIDs in a current state table that corresponds to other quasi-identifier other than the recoded quasi-identifier.

When recoding of all quasi-identifiers is finished, the current state update unit 207 outputs information corresponding to a result of the recoding. The information is, for example, current state tables each of which corresponds to each of all the quasi-identifiers and the CIDs of which have been updated. Alternatively, the information may be an anonymized data set that is generated by updating the anonymization subject data set 800 on the basis of the current state tables the CIDs of which have been updated.

Figure 15:
FIG. 15 is a diagram illustrating an example of an updated current state table in the second exemplary embodiment.

FIG. 15 is a diagram illustrating an example of an updated current state table 852, which is generated from the current state table 850 illustrated in FIG. 11 by reflecting recoded values thereon and updating class IDs therein on the basis of the anonymity verification result 880 illustrated in FIG. 14. The above-described recoded values are recoded values that are included in the interim data 860 illustrated in FIG. 12.

—RCM Update Unit 208—

The RCM update unit 208, in accordance with the anonymity verification result 880 from the anonymity verification unit 206, decides whether or not the interim data 860 is employed. For example, when an anonymity verification result 880 is obtained that indicates that 80% or more of the anonymized records r', each of which corresponds to each of all the anonymization subject records 809, satisfy k-anonymity, the RCM update unit 208 decides that the interim data 860 is employed. When such an anonymity verification result 880 is not obtained, the RCM update unit 208 decides that the interim data 860 is not employed.

When the employment of the interim data 860 is decided, the RCM update unit 208, on the basis of the updated current state table 852 the CIDs of which have been changed, updates the RCM 840. Specifically, the RCM update unit 208 extracts combinations of an RID and a CID from the updated current state table 852, and, on the basis of the extracted combinations, updates the RCM 840.

The RCM update unit 208, on the basis of the anonymity verification result 880, further removes a combination of an RID and a CID that corresponds to an anonymized record r' not satisfying k-anonymity. The RCM update unit 208 may manage a class ID that corresponds to an anonymized record r' not satisfying k-anonymity in a distinguishable manner from a class ID that corresponds to anonymized records satisfying k-anonymity. For example, the RCM update unit 208 may append information (for example, a predetermined value) indicating that k-anonymity is not satisfied to the class ID that corresponds to the anonymized record r' not satisfying k-anonymity.

Figure 16:
FIG. 16 is a diagram illustrating an example of an updated record-class map in the second exemplary embodiment.

FIG. 16 is a diagram illustrating an example of an updated RCM 842, which is generated from the RCM 840 illustrated in FIG. 10 by updating CIDs therein and removing a combination of an RID and a CID therefrom. The above-described update of CIDs is update carried out on the basis of the updated current state table 852 illustrated in FIG. 15. The above-described removal of combinations of an RID and a CID is removal carried out on the basis of the anonymity verification result 880 illustrated in FIG. 14.

When it is decided that the interim data 860 is not employed, the RCM update unit 208 discards the interim data 860. That is, in this case, the RCM update unit 208 does not have to carry out any processing with respect to the interim data 860.

Next, an operation of the exemplary embodiment will be described in detail with reference to the accompanying drawings.

The RCM generation unit 202, on the basis of the anonymization subject data set 800, generates the RCM 840 (step S611). The RCM generation unit 202 initializes all classes of anonymization subject records 809 to the same class (for example, a class having a CID of '1') as an initial state.

Next, the current state generation unit 203, on the basis of the RCM 840, generates a current state table 850 with respect to each quasi-identifier (step S613).

Next, the recoding unit 205 decides possibility/impossibility of recoding (step S615). The above-described possibility/impossibility of recoding means possibility/impossibility of recoding to satisfy k-anonymity with respect to any one of quasi-identifiers that are subjects of anonymization.

When it is decided that recoding is possible (YES in step S615), the process proceeds to step S617. When it is decided that recoding is impossible (NO in step S615), the process proceeds to step S631.

For example, the recoding unit 205 decides that recoding is impossible for a quasi-identifier corresponding to a recoding for which, in the processing of step S623 (will be described later) that has been carried out in advance, it has been decided that an interim data 860 is not employed.

The recoding unit 205 may decide that recoding is possible when there is a possibility that, by carrying out processing in step S617 and later, a criterion for employing the interim data 860 in the RCM update unit 208 is satisfied. The above-described criterion for employment is, for example, whether or not an anonymity verification result 880 is obtained in which 80% or more of anonymized records r', each of which corresponds to each anonymization subject record 809, satisfy k-anonymity. The recoding unit 205 may decide that recoding is impossible when there is no possibility that the criterion for employment is satisfied.

Cases in which there is no possibility that the criterion for employment is satisfied include, for example, a case in which an anonymity verification result 880 from a previous execution of processing in step S617 and later indicates that just 80% of all anonymized records r' satisfy k-anonymity. In other words, the above-described case is a case in which further adding an anonymized record r' that is not included in an anonymization result leads to an anonymity verification result 880 indicating that the percentage of anonymized records r' that satisfy the k-anonymity is less than 80%.

Furthermore, the recoding unit 205 may decide that recoding is impossible when the recoded value coincides with the value of any one of nodes (leaves) at the bottom level of the generalization hierarchy 870. The above-described recoded value is, in the first round of processing of step S615, a recoded value that is included in the current state table 850. The above recoded value is, in the second or later round of the processing of step S615, a recoded value that is included in the interim data 860.

The recoding unit 205 may, regardless of the above description, decide possibility/impossibility of recoding on the basis of an arbitrary condition or combination of conditions.

The decision on the basis of 'the criterion for employing the interim data 860 in the RCM update unit 208' is carried out on the basis of an assumption that, by excluding an anonymized record r' that does not satisfy k-anonymity from an anonymization result, the data set is caused to satisfy k-anonymity as a whole.

When it is decided that recoding is possible, the recoding unit 205 selects a quasi-identifier that becomes a subject of recoding (step S617). The quasi-identifier that becomes a subject of recoding is selected from a group of quasi-identifiers that can be recoded. In the selection, the recoding unit 205, by using an information quantity, such as an information loss, with respect to each quasi-identifier and a recoding method defined with respect to each quasi-identifier, calculates a degree of change and estimated value of such an information quantity when recoding is carried out, and, by using the calculated values, selects a quasi-identifier to be a subject of recoding. The recoding unit 205 may use an arbitrary information quantity as an evaluation criterion for the selection.

In the following description, an operation in step S619 and later will be described under the assumption that a year of birth attribute is selected as a subject of recoding.

The recoding unit 205 processes a recoded value included in the current state table 850 of a subject quasi-identifier on the basis of a per-attribute recoding method corresponding to the subject quasi-identifier to generate an interim data 860 (step S619).

Next, the anonymity verification unit 206, on the basis of the interim data 860 generated in step S619, verifies k-anonymity of the respective anonymized records r' (step S621).

Next, the anonymity verification unit 206, on the basis of a result of the verification, decides whether or not the interim data 860 is employed (step S623). For example, in the interim data 860 illustrated in FIG. 12, as the anonymity verification result 880 in FIG. 14 illustrates, 8 out of 10 records (80%) satisfy k-anonymity. Thus, the anonymity verification unit 206 decides to employ the interim data 860.

When the interim data 860 is employed (YES in step S623), the process proceeds to step S625.

When the interim data 860 is not employed (NO in step S623), the process returns to step S615. In this case, the interim data 860 is discarded.

Next, the current state update unit 207 generates an updated current state table 852 (step S625).

Next, the RCM update unit 208 generates an updated RCM 842 (step S627).

Next, the current state update unit 207, on the basis of the updated RCM 842, updates CIDs in a current state table that corresponds to other quasi-identifier other than the recoded quasi-identifier (step S629). The current state update unit 207 may carry out the update processing before step S619 (recoding). In this case, the current state update unit 207 may carry out the update processing for only the current state table corresponding to the quasi-identifier that is a subject of the recoding.

Next, the current state update unit 207 outputs all the updated current state tables, each of which corresponds to each quasi-identifier (step S631). The current state update unit 207 may, on the basis of the updated current state tables, update the anonymization subject data set 800 to generate and output an anonymized data set.

As described above, the anonymization device 200 of the exemplary embodiment, when anonymity verification is carried out in anonymization the subject of which is multi-dimensional data like the anonymization subject data set 800, refers to a current state table as many times as twice the number 'N (N≥1)' of anonymized records r'. The above-described current state table is the current state table 850 or the updated current state table 852. The number of references to the current state table by the anonymization device 200 is independent of the number 'd (d≥1)' of quasi-identifiers. That is, the anonymity verification device 100 is capable of controlling the number of data references in anonymity verification to 2N. On the other hand, in the related technologies, the data references are carried out as many as dN times.

The above-described exemplary embodiment includes an advantageous effect that, when multi-dimensional data are a subject of anonymization, it is made possible to reduce a calculation cost in anonymity verification in the anonymization.

That is because the following configuration is included. That is, first, the RCM generation unit 202 generates the RCM 840. Second, the current state generation unit 203 generates the current state table 850. Third, the recoding unit 205 generates the interim data 860. Fourth, the anonymity verification unit 206, on the basis of the interim data 860, verifies k-anonymity. Fifth, the current state update unit 207, on the basis of the verification result, updates the current state table 850. Sixth, the RCM update unit 208, on the basis of the verification result and the updated current state table 850, updates the RCM 840 to generate and output the updated RCM 842.

It is not always necessary that the components, which have been explained in each exemplary embodiment, exist independently each other. For example, a plurality of the components may be realized by one module. Moreover, one component may be realized by a plurality of modules. Moreover, one component may have a configuration that the one component is a part of another component. Moreover, one component may have a configuration that a part of the one component overlaps with a part of another component.

Each component and a module which realizes each the component in the above-mentioned exemplary embodiment may be realized by hardware. Moreover, each component and a module which realizes each component may be realized by a computer and a program. Moreover, each component and a module which realizes each component may be realized by mixture of a hardware module with a computer and a program.

The program is recorded in a non-volatile computer readable record medium such as a magnetic disk, a semiconductor memory or the like and is provided by the non-volatile computer readable record medium. Then, the program is read by a computer when activating the computer. By controlling an operation of CPU, the program makes CPU work as each the component which is described in each of the above-mentioned exemplary embodiments Moreover, while a plurality of operations are described in turn in a form of the flowchart according to each of the exemplary embodiments mentioned above, the turn of the description does not limit a turn of carrying out a plurality of operations Therefore, it is possible to change the turn of the plural operation as far as the change does not cause a substantial trouble.

Furthermore, according to each of the exemplary embodiments mentioned above, a plurality of operations are not limited to being carried out at times different each other. For example, while one operation is being carried out, another operation may be activated, and an execution timing of one operation and an execution timing of another operation may overlap each other partially or entirely.

Furthermore, while it is described in each of the exemplary embodiments mentioned above that one operation activates another operation, the description does not limit each relationship between one operation and the other operation. Therefore, when carrying out each exemplary embodiment, each relationship between the operations can be changed as far as the change does not cause a substantial problem. The specific description on each operation of each component does not limit each operation of each component. Therefore, each specific operation of each component may be changed as far as the change does not cause a problem to characteristics of function, performance or the like.

As mentioned above, although the present invention has been described with reference to the exemplary embodiments, the present invention is not limited to the above-mentioned exemplary embodiments. Various changes which a person skilled in the art can understand in the scope of the present invention can be performed in a configuration and details of the present invention.

This application claims priority based on the Japanese Patent Application No. 2013-099432 filed on May 9, 2013 and the disclosure of which is hereby incorporated in its entirety.

REFERENCE SIGNS LIST

100 Anonymity verification device
102 RCM generation unit
106 Anonymity verification unit
108 RCM update unit
200 Anonymization device
202 RCM generation unit
203 Current state generation unit
205 Recoding unit
206 Anonymity verification unit
207 Current state update unit
208 RCM update unit
700 Computer
701 CPU
702 Storage unit
703 Storage device
704 Input unit
705 Output unit
706 Communication unit
707 Recording medium
800 Anonymization subject data set
809 Anonymization subject record
810 Class definition table
820 RCM
821 Updated RCM
830 Anonymity verification result
840 RCM
842 Updated RCM
850 Current state table
852 Updated current state table
860 Interim data
870 Generalization hierarchy
880 Anonymity verification result

The invention claimed is:
1. An information processing device, comprising:
a CPU; and
a storage device including a program, wherein
the CPU reads the program from the storage device and executes function as:
a correspondence information generation unit which generates record-class correspondence information that indicates correspondences between a record included in a data set and a class that specifies unique combinations of quasi-identifier attribute values, which are values of quasi-identifiers included in said record;

an anonymity verification unit which verifies anonymity for each said record on the basis of said classes that are indicated in said record-class correspondence information; and a correspondence information update unit which, on the basis of a result of verifying said anonymity, updates said record-class correspondence information in such a way whether or not that said record satisfies said anonymity is distinguishable and outputs said record-class correspondence information.

2. The information processing device according to claim 1, the CPU reads the program from the storage device and further executes function as:

a current state generation unit which, on the basis of said record-class correspondence information and said quasi-identifier attribute values, generates, with respect to each variety of said quasi-identifier, current state information that indicates correspondences between said record, said class, and a recoded value corresponding to said quasi-identifier attribute value; and a recoding unit which processes said recoded value included in said current state information, wherein said anonymity verification unit, on the basis of said recoded value, verifies anonymity for each said record, a current state update unit which, on the basis of said recoded value and a result of verifying said anonymity, updates said current state information and updates information corresponding to a result of the updating, wherein said correspondence information update unit, on the basis of said updated current state information, updates said record-class correspondence information.

3. The information processing device according to claim 2, wherein said recoding unit, on the basis of a generalization hierarchy that includes, at the highest level, a root with a value covering all values that said quasi-identifier can take and, towards lower levels, nodes with values that are specialized step-by-step, generates said recoded value.

4. The information processing device according to claim 1, wherein said correspondence information update unit updates said record-class correspondence information by removing information corresponding to said record that does not satisfy said anonymity from said record-class correspondence information.

5. The information processing device according to claim 1, wherein said correspondence information update unit updates said record-class correspondence information by appending information indicating that said anonymity is not satisfied to information corresponding to said record that is included in said record-class correspondence information and does not satisfy said anonymity.

6. The information processing device according to claim 1, wherein said correspondence information update unit updates said record-class correspondence information by changing information corresponding to said record that is included in said record-class correspondence information and does not satisfy said anonymity to information indicating that said anonymity is not satisfied.

7. An anonymity verification method by which an information processing device executes the steps of:

generating record-class correspondence information that indicates correspondences between a record included in a data set and a class that specifies unique combinations of quasi-identifier attribute values, which are values of quasi-identifiers included in said record;

verifying anonymity for each said record on the basis of said classes indicated in said record-class correspondence information; and updating said record-class correspondence information on the basis of a result of verifying said anonymity in such a way that whether or not said record satisfies said anonymity is distinguishable and outputting said record-class correspondence information.

8. The anonymity verification method according to claim 7 in which said information processing device executes the steps of:

generating, with respect to each variety of said quasi-identifier, current state information that indicates correspondences between said record, said class, and a recoded value corresponding to said quasi-identifier attribute value on the basis of said record-class correspondence information and said quasi-identifier attribute values;

processing said recoded value included in said current state information;

the verifying of said anonymity verifying anonymity for each said record on the basis of said recoded value;

updating said current state information on the basis of said recoded value and a result of verifying said anonymity and outputting information corresponding to a result of the updating; and the updating of said record-class correspondence information updating said record-class correspondence information on the basis of said updated current state information.

9. A computer-readable non-transitory recording medium recording a program, the program making a computer execute the steps of:

generating record-class correspondence information that indicates correspondences between a record included in a data set and a class that specifies unique combinations of quasi-identifier attribute values, which are values of quasi-identifiers included in said record;

verifying anonymity for each said record on the basis of said classes indicated in said record-class correspondence information; and updating said record-class correspondence information on the basis of a result of verifying said anonymity in such a way that whether or not said record satisfies said anonymity is distinguishable and outputting said record-class correspondence information.

10. The computer-readable non-transitory recording medium recording a program according to claim 9, the program making a computer execute the steps of:

generating, with respect to each variety of said quasi-identifier, current state information that indicates correspondences between said record, said class, and a recoded value corresponding to said quasi-identifier attribute value on the basis of said record-class correspondence information and said quasi-identifier attribute values;

processing said recoded value included in said current state information;

the verifying of said anonymity verifying anonymity for each said record on the basis of said recoded value;

updating said current state information on the basis of said recoded value and a result of verifying said anonymity and outputting information corresponding to a result of the updating; and the updating of said record-class correspondence information updating said record-class correspondence information on the basis of said updated current state information.

\* \* \* \* \*